United States Patent
Yang et al.

(10) Patent No.: US 9,137,119 B2
(45) Date of Patent: Sep. 15, 2015

(54) EFFICIENT HANDLING OF MULTI-DESTINATION TRAFFIC IN AN INTERNET PROTOCOL FABRIC DATA CENTER

(71) Applicants: Yibin Yang, San Jose, CA (US); Liqin Dong, San Jose, CA (US); Chiajen Tsai, Cupertino, CA (US)

(72) Inventors: Yibin Yang, San Jose, CA (US); Liqin Dong, San Jose, CA (US); Chiajen Tsai, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 282 days.

(21) Appl. No.: 13/788,602

(22) Filed: Mar. 7, 2013

(65) Prior Publication Data

US 2014/0258485 A1  Sep. 11, 2014

(51) Int. Cl.
| | |
|---|---|
| G06F 15/16 | (2006.01) |
| H04L 12/24 | (2006.01) |
| H04L 12/751 | (2013.01) |
| H04L 12/753 | (2013.01) |
| H04L 12/703 | (2013.01) |
| H04L 12/715 | (2013.01) |
| H04L 12/761 | (2013.01) |

(52) U.S. Cl.
CPC ............... *H04L 41/12* (2013.01); *H04L 45/02* (2013.01); *H04L 45/04* (2013.01); *H04L 45/16* (2013.01); *H04L 45/28* (2013.01); *H04L 45/48* (2013.01)

(58) Field of Classification Search
CPC ......... H04L 45/02; H04L 41/04; H04L 45/28; H04L 45/16; H04L 45/48
USPC ........... 709/220–224, 225; 370/216, 254, 256
See application file for complete search history.

(56) References Cited

U.S. PATENT DOCUMENTS

| | | | | |
|---|---|---|---|---|
| 8,238,269 | B2 * | 8/2012 | Rousseau et al. | 370/256 |
| 8,625,467 | B2 * | 1/2014 | Ouellette et al. | 370/256 |
| 2011/0199941 | A1 * | 8/2011 | Ouellette et al. | 370/256 |
| 2012/0039161 | A1 * | 2/2012 | Allan et al. | 370/216 |
| 2013/0003733 | A1 | 1/2013 | Venkatesan et al. | |
| 2013/0021896 | A1 * | 1/2013 | Pu et al. | 370/216 |

OTHER PUBLICATIONS

U.S. Appl. No. 13/653,129, filed Oct. 16, 2012, entitled "Detection of Cabling Error in Communication Network," Inventors: Vipin Jain, et al.
U.S. Appl. No. 13/787,453, filed Mar. 6, 2013, entitled "Scalable Multicast Route Distribution in a Multitenant Data Center Fabric in a Network Environment," Inventors: Yibin Yang, et al.
R. Perlman, "Routing Bridges (RBridges): Base Protocol Specification," Internet Engineering Task Force (IETF), RFC 6325, ISSN: 2070-1721, Jul. 2011, 99 pages; http://www.ietf.org/rfc/rfc6325.txt.
B. Bhikkaji, et al., "Connecting Disparate TRILL-Based Data Center/PBB/Campus Sites Using BGP," L2VPN Working Group, Internet-Draft, Aug. 3, 2012, 37 pages; http://tools.ietf.org/pdf/draft-balaji-l2vpn-trill-over-ip-multi-level-02.pdf.
M. Mahalingam, et al., "VXLAN: A Framework for Overlaying Virtualized Layer 2 Networks Over Layer 3 Networks," Network Working Group, Internet Draft, Aug. 22, 2012, 20 pages; http://tools.ietf.org/pdf/draft-mahalingam-dutt-dcops-vxlan-02.pdf.

* cited by examiner

*Primary Examiner* — Moustafa M Meky
(74) *Attorney, Agent, or Firm* — Patent Capital Group

(57) ABSTRACT

A method is provided in one example embodiment and includes establishing at least one fixed topology distribution tree in a network, where the fixed topology distribution tree comprises one root node and a plurality of leaf nodes connected to the root node; maintaining at the root node an indication of multicast group interests advertised by the leaf nodes; and pruning traffic at the root node based on the advertised multicast group interests of the leaf nodes. In one embodiment, the root node is a spine switch and each of the leaf nodes is a leaf switch and each of the leaf nodes is connected to the root node by a single hop.

22 Claims, 3 Drawing Sheets

EFFICIENT HANDLING OF MULTI-DESTINATION TRAFFIC IN AN INTERNET PROTOCOL FABRIC DATA CENTER

TECHNICAL FIELD

This disclosure relates in general to the field of computer networking and, more particularly, to techniques for efficient handling of multi-destination traffic in an IP fabric using fixed topology distribution trees.

BACKGROUND

Internet Protocol ("IP") fabric Vinci is a relatively new architecture for data center networking. The physical topology of IP fabric Vinci is based on a two-tier fat-tree, also called a Clos network, where every leaf switch is connected to every spine switch and vice versa. The topology is guaranteed through mechanisms that enable automatic detection of miscabling between link peers in the network fabric based on tier level checks and/or a user-defined cable plan. Within the fabric, a link state protocol, such as Intermediate System to Intermediate System ("IS-IS") or Open Shortest Path First ("OSPF"), may be used for unicast control.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
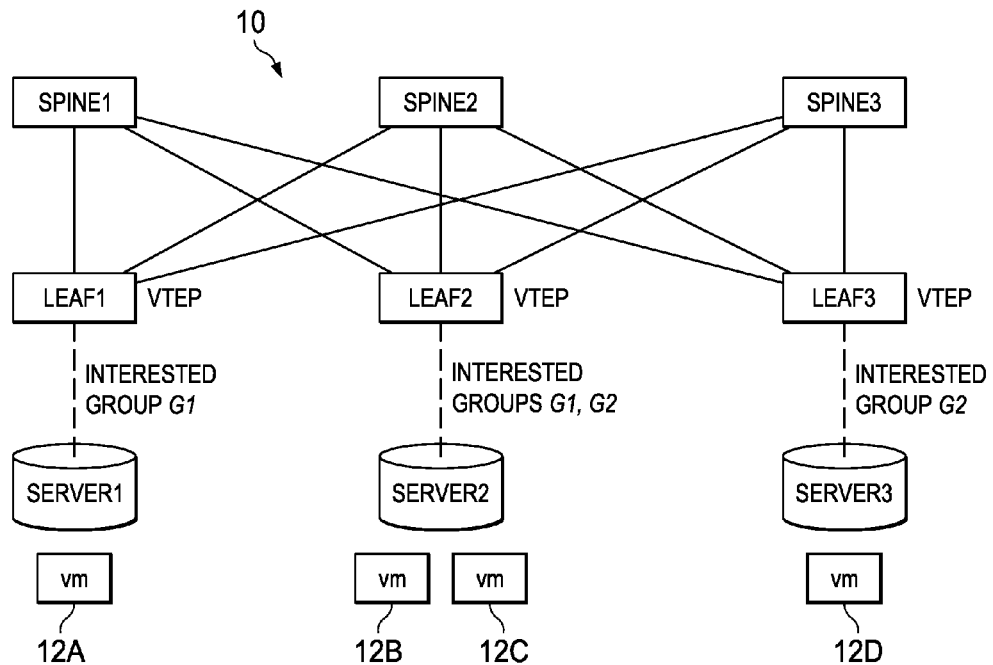
FIG. 1 is a simplified block diagram of an example IP fabric Vinci network environment in accordance with aspects of one embodiment.

A method is provided in one example embodiment and includes establishing (e.g., assigning, designating, provisioning, providing, etc.) at least one fixed topology distribution tree in a network, where the fixed topology distribution tree comprises one root node and a plurality of leaf nodes connected to the root node; maintaining (e.g., managing, storing, etc.) an indication of multicast group interests advertised by the leaf nodes; and pruning (e.g., filtering, processing, discarding a portion of, sorting, categorizing, etc.) traffic at the root node based on the advertised multicast group interests of the leaf nodes. In one embodiment, the root node is a spine switch and each of the leaf nodes is a leaf switch. Each of the leaf nodes can be connected to the spine node by a single hop.

EXAMPLE EMBODIMENTS

As used herein, Virtual Interacting Network Community ("Vinci") refers generally to a data center fabric architecture built on a spine-leaf topology that provides optimal connectivity at layer 2 ("L2") and layer 3 ("L3") between hosts that are connected to leaf switches in the fabric and between hosts and the external network. In general terms, Vinci is a software architecture that can exploit virtualization to share in a secure way an information and communication technology infrastructure among a set of users with distinct security levels and reliability requirements. To this purpose, Vinci decomposes users into communities, each consisting of a set of users, their applications, a set of services and shared resources. Users with distinct privileges and applications with distinct trust levels belong to distinct communities. Each community is supported by a virtual network (i.e., a structured and highly parallel overlay that interconnects virtual machines (VMs), each built by instantiating one of a predefined set of VM templates). Some VMs of a virtual network run user applications, some protect shared resources, and some others control traffic among communities to discover malware or worms. Further VMs manage the infrastructure resources and configure the VMs at start-up. The adoption of several VM templates enables Vinci to minimize the complexity of each VM and increases the robustness of both the VMs and of the overall infrastructure.

The control plane, enhanced forwarding semantics, and management techniques provide the framework to support L2 or L3 fabrics. Any suitable encapsulation can be used to transport packets across the fabric where the transit nodes switch only on the fabric overlay header. One implementation of the Vinci architecture is based on an IP fabric. The L2 and L3 traffic being forwarded between the leaf nodes may be encapsulated in an IP. The nodes in the fabric that provide transit, such as the spine nodes, may switch traffic based on the information in the IP header.

Overlay networks in general, and Internet protocol ("IP") overlay networks in particular, are gaining popularity for providing virtual machine ("VM") mobility over L3 networks. Virtual eXtensible Local Area Network ("VXLAN") is a technique for providing an L2 overlay on an L3 network. In particular, VXLAN is used to address the need for overlay networks within virtualized data centers accommodating multiple tenants. In such overlay networks, native frames are encapsulated with an outer IP overlay encapsulation, as along with a VXLAN header, and UDP header. The VXLAN header contains VLXAN segment ID/VXLAN network identifier ("VNI"), which is a 24-bit field that identifies virtual L2 networks for different tenants. Multi-destination frames in VLXAN are carried in underlying IP multicast packets, which use group addresses (possibly allocated per VNI) as destination IP addresses.

In VXLAN, each overlay is referred to as a VXLAN segment. VMs within the same VLXAN segment are within the same layer 2 domain. Each VXLAN segment is scoped through a 24-bit segment ID, referred to as a VXLAN Network Identifier ("VNI"), which allows up to 16M VXLAN segments to coexist within a single administrative domain. The VNI scopes the inner MAC frame originated by the individual VM; therefore, overlapping MAC addresses may exist across segments without resulting in traffic crossover. The VNI is in an outer header envelope in which the inner MAC frame originated by the VM is encapsulated. The term "VXLAN segment" herein may be used interchangeably with the term "VXLAN overlay network." VXLAN may be used in IP fabric Vinci as the overlay solution.

FIG. 1 depicts an example Vinci deployment in an IP fabric network 10, which in one embodiment comprises a portion of a Massive Scalable Data Center ("MSDC") network. As shown in FIG. 1, the network 10 includes three spine routers, or nodes, spine1, spine2, and spine3, and three leaf routers, or nodes, leaf1, leaf2, and leaf3. Each of the leaf nodes leaf1, leaf2, and leaf3 is connected to each of the spine nodes spine1, spine2, and spine3 in accordance with Vinci two-tier fat tree topology. In the illustrated embodiment, servers, represented by server1, server2, and server3, are connected to the leaf nodes leaf1, leaf2, and leaf3, and host a plurality of VMs, represented by VMs 12A-12D. For purposes of illustration, it will be assumed that two of the VMs (specifically, VMs 12A and 12B) are associated with a first tenant and the remaining VMs (VMs 12C and 12D) are associated with a second tenant.

In accordance with one embodiment, to support VXLAN overlay, each of leaf nodes leaf1, leaf2, and leaf3 functions as a VXLAN Tunnel End Point ("VTEP"). VTEPs perform VXLAN encapsulation and decapsulation on frames coming from and going to, respectively, VMs running on the servers attached to the leafs. The VMs themselves are unaware of both VXLAN and the function of the VTEPs. For example, leaf1 functions as a VTEP to encapsulate frames originating from VMs 12A and to decapsulate frames destined for VM 12A. Leaf2 functions as a VTEP to encapsulate frames originating from VMs 12B and 12C and to decapsulate frames destined for VMs 12B and 12C. Finally, leaf3 functions as a VTEP to encapsulate frames originating from VM 12D and to decapsulate frames destined for VM 12D.

IP group addresses G1 and G2 are allocated to carry VLXAN multi-destination traffic of the first tenant (with which VMs 12A and 12B are associated) and second tenant (with which VMs 12C and 12D are associated), respectively. Based on the presence of VMs, which may belong to different tenants, hosted by the server(s) attached thereto, leaf nodes may advertise interest in corresponding multicast groups. For example, leaf1 is interested in multicast groups of G1, since VM 12A of the first tenant is hosted on server1, which is attached to leaf1. Similarly, leaf2 is interested in multicast groups of both G1 and G2, since VM 12B of the first tenant and VM 12C of the second tenant are both hosted on server2 attached to it. Finally, leaf3 is interested in multicast groups of G2, since VM 12D of the second tenant is hosted on server3 attached to it. It is highly desirable for IP fabric Vinci to handle IP multicast efficiently, as VLXAN relies on it for multi-destination frame transport. There are currently at least three possible approaches for supporting IP multicast in IP fabric Vinci.

One approach is to use an existing IP multicast protocol, such as Protocol Independent Multicast ("PIM"). Using PIM may not always be feasible; however, as many customers strongly object to turning on IP multicast PIM control in their data centers because it is highly sophisticated and involves many multicast states. Another approach is to use the TRansparent Interconnection of Lots of Links ("TRILL") distribution tree scheme, as described in Internet Engineering Task Force Request for Comments: 6325 ("IETF RFC 6325"). This approach is problematic because even if L3 IS-IS may be enhanced to incorporate all TRILL IS-IS mechanisms of supporting distribution tree, it would be difficult if not impossible to change the IP packet format to carry a distribution tree ID (which is carried in TRILL by the egress nickname and in FabricPath by the Forwarding Tag ("FTag")). A third approach is to use head end leaf replication to send a multi-destination packet as multiple unicast packets. This approach, while theoretically viable, is clearly inefficient. Because a large number of VTEPs may be interested in a same group address, head end leaf replication can waste a lot of fabric bandwidth and thus will not scale, especially in multicast heavy deployment.

Figure 2:
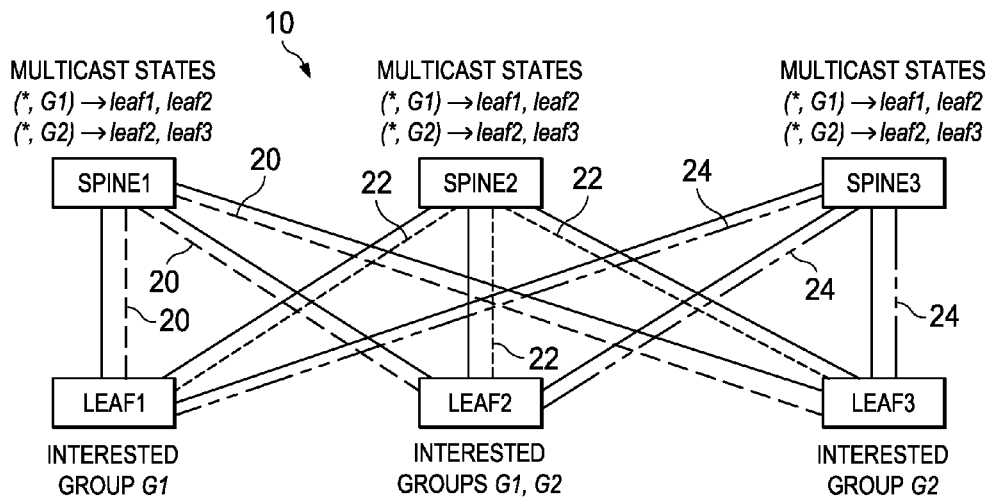
FIG. 2 is a simplified block diagram of an example IP fabric Vinci network environment in which fixed topology distribution trees are deployed in accordance with aspects of one embodiment.

In contrast, in accordance with various embodiments described herein, a fixed topology distribution tree is used to support IP multicast in IP fabric Vinci. In one embodiment, a fixed topology distribution tree is rooted at a spine node and reaches all leafs directly, as illustrated in FIG. 2. Referring to FIG. 2, a first fixed topology distribution tree (represented by dashed lines 20, collectively) is rooted at spine1 and reaches each of leaf nodes leaf1, leaf2, and leaf3 in a single hop. There is no need for the tree 20 to reach spine nodes spine2 or spine3, as no servers are attached to them. Similarly, a second fixed topology distribution tree (represented by dashed lines 22, collectively) is rooted at spine2 and reaches each of leaf nodes leaf1, leaf2, and leaf3 in a single hop. Again, there is no need for the tree 22 to reach spine nodes spine1 or spine3, as no servers are attached to them. Finally, a third fixed topology distribution tree (represented by dashed lines 24, collectively) is rooted at spine3 and reaches each of leaf nodes leaf1, leaf2, and leaf3, in a single hop. As with the trees 20 and 22, there is no need for the tree 24 to reach spine nodes spine1 or spine2, as no servers are attached to them.

A fixed topology distribution tree as described herein is made possible by taking advantage of the Vinci-specific Clos network topology. A new IS-IS Fixed Topology Distribution Tree Root Type-Length-Value ("TLV") is introduced and employed to allow a spine node to announce the availability of a fixed topology distribution tree rooted at the node. For example, spine1 can use the new Root TLV to advertise to all leaf nodes leaf1, leaf2, leaf3, that there is a fixed topology distribution tree (tree 20) rooted at spine1 so that the leaf nodes leaf1, leaf2, and leaf3, can send IP multicast traffic to spine1. Similarly, spine2 can use the new Root TLV to advertise to all leaf nodes leaf1, leaf2, leaf3, that there is a fixed topology distribution tree (tree 22) rooted at spine2 so that the leaf nodes leaf1, leaf2, and leaf3, can send IP multicast traffic to spine2 and spine3 can use the new Root TLV to advertise to all leaf nodes leaf1, leaf2, leaf3, that there is a fixed topology distribution tree (tree 24) rooted at spine3 so that the leaf nodes leaf1, leaf2, and leaf3, can send IP multicast traffic to spine3.

If there are only fixed topology distribution trees present in the fabric, a spine node will not belong to more than one distribution tree. By definition, a fixed topology distribution tree is rooted in one spine node and does not contain another spine node. When a leaf node sends a multicast packet to a spine, there is no ambiguity as to which distribution tree will be used; therefore, there is no need for distribution tree identification in the packet. For example, when leaf node leaf1 sends a multicast packet to spine node spine1, it is clear that the distribution tree 20 will be used to distribute the packet, as spine1 is only included in the distribution tree 20. Similarly, when leaf node leaf1 sends a multicast packet to spine node spine2, the distribution tree 22 will be used. In contrast, a leaf node may exist in more than one fixed topology distribution tree; however, a leaf node will never serve as a transit node for any fixed topology distribution tree. In other words, leaf nodes are commonly endpoint nodes in fixed topology distribution trees.

Because there is no need for distribution tree identification in connection with fixed topology distribution trees, a leaf node can prevent multicast traffic from being forwarded from one fixed topology distribution tree to another through a concept referred to as "split horizon." Split horizon ensures that no multicast packet from one spine node is sent back to any other spine node from a leaf node. For example, consider a multicast packet of group G2 sent by leaf node leaf2 along the fixed topology distribution tree 22. The packet will reach leaf node leaf3 via spine node spine2, but due to split horizon, it will not be forwarded by leaf node leaf3 to spine node spine1 along the fixed topology distribution tree 20 nor will it be forwarded by leaf node leaf3 to spine node spine3 along the fixed topology distribution tree 24. Due to its simplicity, split horizon will likely already be implemented in leaf router hardware. If it is not, it is easily accomplished. Given that a leaf node can forward traffic to multiple spines, whereas each spine node is the root for a separate fixed topology distribution tree, leaf nodes should be able to load balance multicast traffic in a very flexible way, such as by selecting a distribution tree for multicast traffic based on hashing the payload.

The spine nodes are able to derive multicast states based on group interests either advertised by Border Gateway Protocol ("BGP") or queried through Locator/Identifier Separation Protocol ("LISP"). For ease of explanation, it will be assumed herein that BGP, as opposed to LISP, is used. Leaf nodes use BGP to advertise their group interest to a route reflector ("RR") (not shown), which in turn reflects the advertised group interests to spine nodes. The spine nodes will then know to which leaf nodes the multicast traffic of a group G should be sent. Each spine node will program (*, G) multicast state accordingly. For example, referring again to FIG. 2, spine node spine1 learns through BGP that the VTEP comprising leaf node leaf2 is interested in groups G1 and G2. It will then place its port connecting to leaf node leaf2 into outgoing interface lists of multicast groups G1 and G2. Similarly, spine node spine1 learns through BGP that the VTEP comprising leaf node leaf1 is interested in group G1 only. It will then place its port connecting to leaf node leaf1 into outgoing interface list of multicast group G1 but not that of G2. Therefore, pruning is performed for multicast group G2 on the fixed topology distribution tree rooted at spine node spine1. Similarly, spine node spine1 learns through BGP that the VTEP comprising leaf node leaf3 is interested in group G2 only. Spine node spine1 will then place its port connecting to leaf node leaf3 onto outgoing interface list of multicast group G2 but not that of G1. Therefore, pruning is performed for multicast group G1 on the fixed topology distribution tree rooted at spine node spine1. In summary, VXLAN multi-destination frames are transported in IP multicast packets forwarded along the fixed topology distribution trees, which are pruned based on the group addresses used by the VTEPs connected to the spine nodes. No multicast protocol, such as PIM, is needed while BGP can be used for distribution of group interests.

Figure 3:
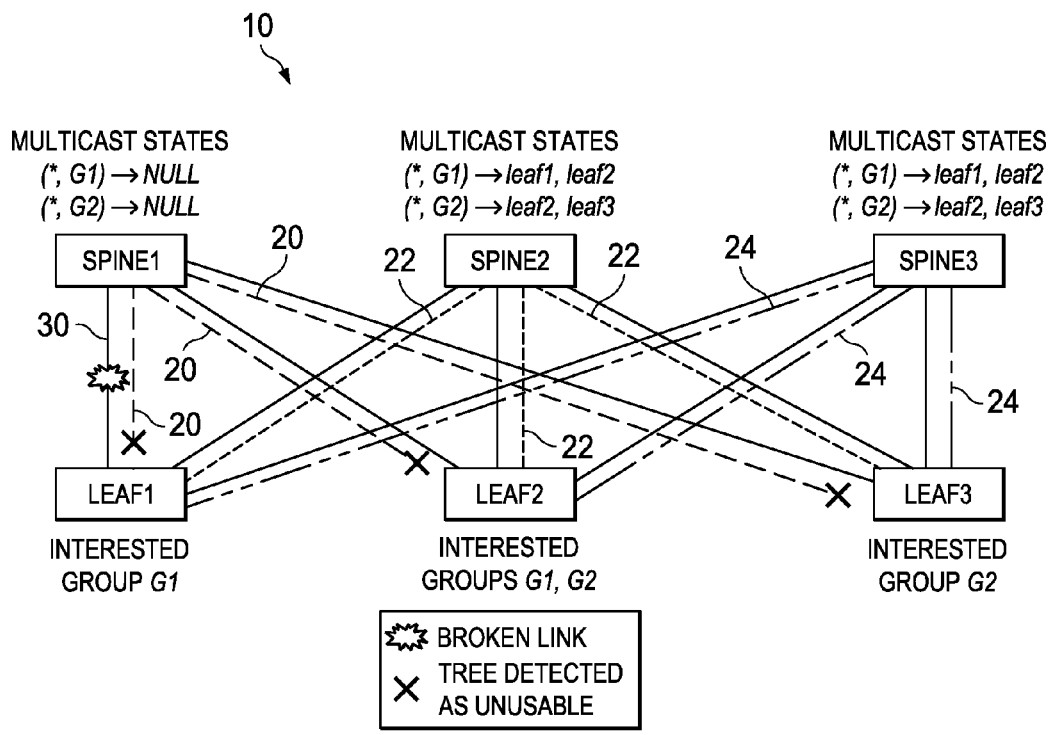
FIG. 3 is a simplified block diagram illustrating an approach for handling a broken link of an example IP fabric Vinci network environment in which fixed topology distribution trees are deployed in accordance with aspects of one embodiment.

Thus far, scenarios have been described in which all links in the network 10 are in working order. FIG. 3 illustrates a scenario in which a link 30 between spine node spine1 and leaf node leaf1 is broken. In this situation, traditionally, the affected distribution tree, in this case, distribution tree 20, would be recalculated, likely resulting in spine node spine2 being used as the transit node to reach leaf node leaf1. In the embodiments described herein, such a recalculation could lead to ambiguity of multicast forwarding in spine node spine2, as that node would be in both the recalculated distribution tree 20 and the distribution tree 22. In contrast, in accordance with features of embodiments described herein, the distribution tree 20 is simply designated as unusable after a link failure. The unusability of the distribution tree 20 can be readily detected by the leaf nodes leaf1, leaf2, and leaf3, based on the IS-IS link state information. The leaf nodes leaf1, leaf2, leaf3, may then reroute their multicast traffic from the distribution tree 20 to either the distribution tree 22 or the distribution tree 24 (head end rerouting). Since the multicast convergence depends on the same link state information used by the unicast, it can be as fast as the unicast convergence. For example, as shown in FIG. 3, leaf node leaf1 should be able to detect the distribution tree 20 as unusable locally, while leaf node leaf2 and leaf node leaf3 detect it through the IS-IS link state information. Afterwards, all of the leaf nodes leaf1, leaf2, leaf3, will reroute their multicast traffic from the distribution tree 20 to the distribution tree 22 or the distribution tree 24.

In a typical scenario in which there are a reasonable number of fixed topology distribution trees and few links fail at the same time, leaf nodes should be able to find at least one useable fixed topology distribution trees to use for rerouting traffic. On the other hand, in an extreme and rare scenario in which no usable fixed topology distribution trees remain, leaf nodes should fall back to the head end leaf replication approach described above. In particular, head end leaf replication may be used to send a multicast packet as multiple unicast packets. As previously mentioned, this approach, while certainly viable, is clearly inefficient and therefore should not be used unless completely necessary.

The embodiments described herein do not require any changes to be made to the hardware of the routers used to implement the spine nodes. Additionally, they avoid running IP multicast PIM control protocol in the fabric. The embodiments further avoid TRILL-style distribution tree calculation by taking advantage of the Vinci-specific Clos network topology and avoid head end leaf replication when there is no link failure, as well as during a large majority of cases in which there is link failure. The embodiments achieve optimal forwarding by taking advantage of the Vinci-specific Clos network topology, is capable of flexible load balancing, such as hashing on payload, and provides N-way active/active redundancy with complexity independent of N, where n is the number of fixed topology distribution trees.

Figure 4:
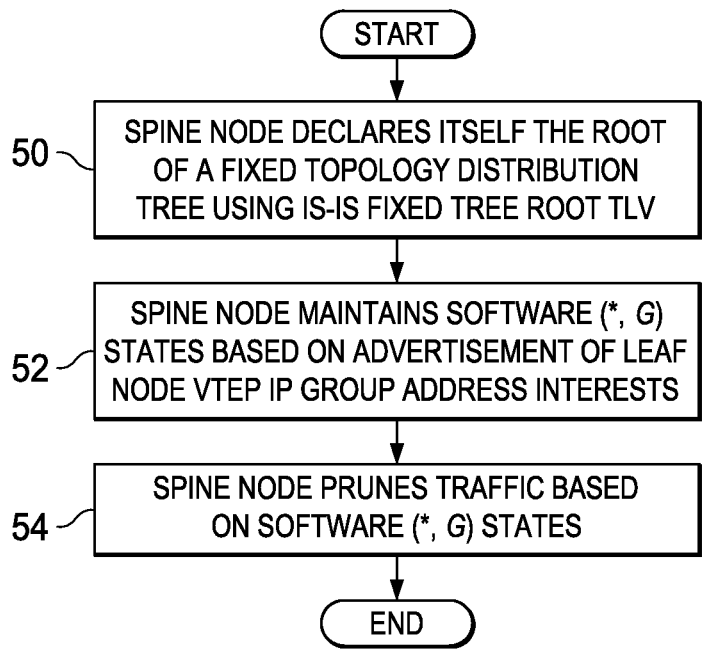
FIG. 4 is a flowchart illustrating operation of an exemplary embodiment for implementing fixed topology distribution trees for handling VXLAN multi-destination traffic in an IP fabric Vinci network environment.

FIG. 4 is a flowchart illustrating operation of an exemplary embodiment using fixed topology distribution trees for efficient multicast handling in an IP fabric Vinci network in accordance with aspects of various embodiments. It will be recognized that the technique illustrated in and described with reference to FIG. 4 may be implemented by each spine node, in a data center or other network, such as the network 10, for implementing various features described herein. Referring to FIG. 4, in step 50, the spine node declares itself a root of a fixed topology distribution tree using the IS-IS Fixed Tree Root TLV described hereinabove. In step 52, the spine node maintains software (*, G) states based on advertisement of leaf node VTEP IP group address interests. In step 54, the spine node prunes traffic based on (*, G) states maintained by the spine node.

In one example implementation, various devices involved in implementing the embodiments described herein can include software for achieving the described functions. For example, referring to FIG. 5, each of the spine nodes of the embodiments described herein, represented in FIG. 5 by a spine node 60, may include a fixed topology distribution tree ("FTDT") module 62, which comprises software embodied in one or more non-transitory, tangible media for facilitating the activities described herein. The spine node 60 may also include a memory device (or memory element) 64 for storing information to be used in achieving the functions as outlined herein. Additionally, the spine node 60 may include a processor 66 that is capable of executing software or an algorithm (such as embodied in module 62) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Figure 5:
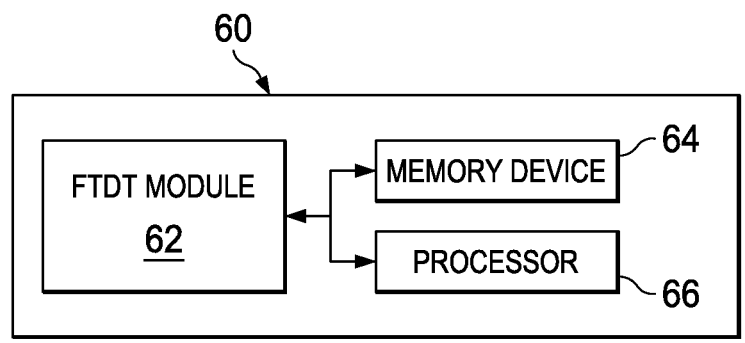
FIG. 5 is a simplified block diagram of a spine node for implementing fixed topology distribution trees for handling VXLAN multi-destination traffic in an IP fabric Vinci network environment in accordance with one embodiment.

Note that in certain example implementations, the functions outlined herein and in FIG. 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 5, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein (e.g., the various VTEPs, spine nodes, leaf nodes, root nodes) can be provisioned as part of any type of network element. As used herein, the terms "network element", "network device", "leaf node", "root node", "spine node", "switch", etc. can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   establishing at least one fixed topology distribution tree in a network, wherein the fixed topology distribution tree comprises one root node and a plurality of leaf nodes connected to the root node;
   maintaining an indication of multicast group interests advertised by the leaf nodes; and
   pruning traffic at the root node based on the advertised multicast group interests of the leaf nodes wherein leaf nodes load balance multicast traffic by selecting a distribution tree based on hashing the payload, when there are multiple fixed topology trees available;
   wherein leaf nodes load balance multicast traffic by selecting a distribution tree based on hashing the payload when there are multiple fixed topology trees available.

2. The method of claim 1, wherein a Fixed Topology Distribution Tree Root Type-Length-Value ("TLV") is used to announce an availability of a fixed topology distribution tree at the root node.

3. The method of claim 1, wherein the network is a Vinci topology network.

4. The method of claim 1, wherein the root node is a spine switch and each of the leaf nodes is a leaf switch.

5. The method of claim 1, wherein at least some of the leaf nodes function as a Tunnel End Point to perform encapsulation and decapsulation on frames associated with virtual machines (VMs).

6. The method of claim 1 further comprising:
   designating the fixed topology distribution tree as unusable if a link between the root node and one of the leaf nodes fails.

7. The method of claim 6, wherein the establishing further comprises a plurality of fixed topology distribution trees, the method further comprising rerouting traffic from one of the fixed topology distribution trees designated as unusable to another one of the fixed topology distribution trees.

8. The method of claim 1, wherein each of the leaf nodes comprise a Virtual Tunnel End Point ("VTEP").

9. The method of claim 1, wherein the fixed topology distribution tree reaches a majority of the leafs directly in a single hop in the network.

10. One or more non-transitory tangible media that includes code for execution and when executed by a processor is operable to perform operations comprising:
    establishing at least one fixed topology distribution tree in a network, wherein the fixed topology distribution tree comprises one root node and a plurality of leaf nodes connected to the root node;
    maintaining an indication of multicast group interests advertised by the leaf nodes; and
    pruning traffic at the root node based on the advertised multicast group interests of the leaf nodes;
    wherein leaf nodes load balance multicast traffic by selecting a distribution tree based on hashing the payload when there are multiple fixed topology trees available.

11. The media of claim 10, wherein the network is an IP fabric Vinci network.

12. The media of claim 10, wherein the root node is a spine switch and each of the leaf nodes is a leaf switch and wherein each of the leaf nodes is connected to the root node by a single hop.

13. The media of claim 10 further comprising designating the fixed topology distribution tree as unusable if a link between the root node and one of the leaf nodes fails.

14. The media of claim 13, wherein the establishing further comprises a plurality of fixed topology distribution trees, the method further comprising rerouting traffic from one of the fixed topology distribution trees designated as unusable to another one of the fixed topology distribution trees.

15. The media of claim 10, wherein the establishing further comprises the root node declaring itself the root of the fixed topology distribution tree via a Tree Root Type-Length-Value ("TLV").

16. An apparatus, comprising:
    a memory element configured to store data;
    a processor operable to execute instructions associated with the data; and
    a fixed topology distribution tree ("FTDT") module configured to:
      establish at least one fixed topology distribution tree in a network, wherein the fixed topology distribution tree comprises one root node and a plurality of leaf nodes connected to the root node;
      maintain an indication of multicast group interests advertised by the leaf nodes; and
      prune traffic based on the advertised multicast group interests of the leaf nodes;
    wherein leaf nodes load balance multicast traffic by selecting a distribution tree based on hashing the payload when there are multiple fixed topology trees available.

17. The apparatus of claim 16, wherein the network is an Internet Protocol ("IP") fabric having a Vinci topology, and wherein each of the leaf nodes is a Virtual Tunnel End Point ("VTEP").

18. The apparatus of claim 16, wherein the apparatus is the root node, which is a spine switch, and wherein each of the leaf nodes is a leaf switch.

19. The apparatus of claim 16 wherein the fixed topology distribution tree is designated as unusable if a link between the root node and one of the leaf nodes fails.

20. A method, comprising:
    establishing a plurality of fixed topology distribution tree in a network, wherein the fixed topology distribution tree comprises one root node and a plurality of leaf nodes connected to the root node;
    maintaining an indication of multicast group interests advertised by the leaf nodes;
    pruning traffic at the root node based on the advertised multicast group interests of the leaf nodes wherein leaf nodes load balance multicast traffic by selecting a distribution tree based on hashing the payload, when there are multiple fixed topology trees available;
    designating the fixed topology distribution tree as unusable if a link between the root node and one of the leaf nodes fails; and
    rerouting traffic from one of the fixed topology distribution trees designated as unusable to another one of the fixed topology distribution trees.

21. One or more non-transitory tangible media that includes code for execution and when executed by a processor is operable to perform operations comprising:
    establishing at least one fixed topology distribution tree in a network, wherein the fixed topology distribution tree comprises one root node and a plurality of leaf nodes connected to the root node;
    maintaining an indication of multicast group interests advertised by the leaf nodes;
    pruning traffic at the root node based on the advertised multicast group interests of the leaf nodes;
    designating the fixed topology distribution tree as unusable if a link between the root node and one of the leaf nodes fails; and rerouting traffic from one of the fixed topology distribution trees designated as unusable to another one of the fixed topology distribution trees.

22. An apparatus, comprising:
a memory element configured to store data;
a processor operable to execute instructions associated with the data; and
a fixed topology distribution tree ("FTDT") module configured to:
  establish at least one fixed topology distribution tree in a network, wherein the fixed topology distribution tree comprises one root node and a plurality of leaf nodes connected to the root node;
  maintain an indication of multicast group interests advertised by the leaf nodes;
  prune traffic based on the advertised multicast group interests of the leaf nodes;
  designate the fixed topology distribution tree as unusable if a link between the root node and one of the leaf nodes fails; and
  reroute traffic from one of the fixed topology distribution trees designated as unusable to another one of the fixed topology distribution trees.

* * * * *